Patented Mar. 2, 1954

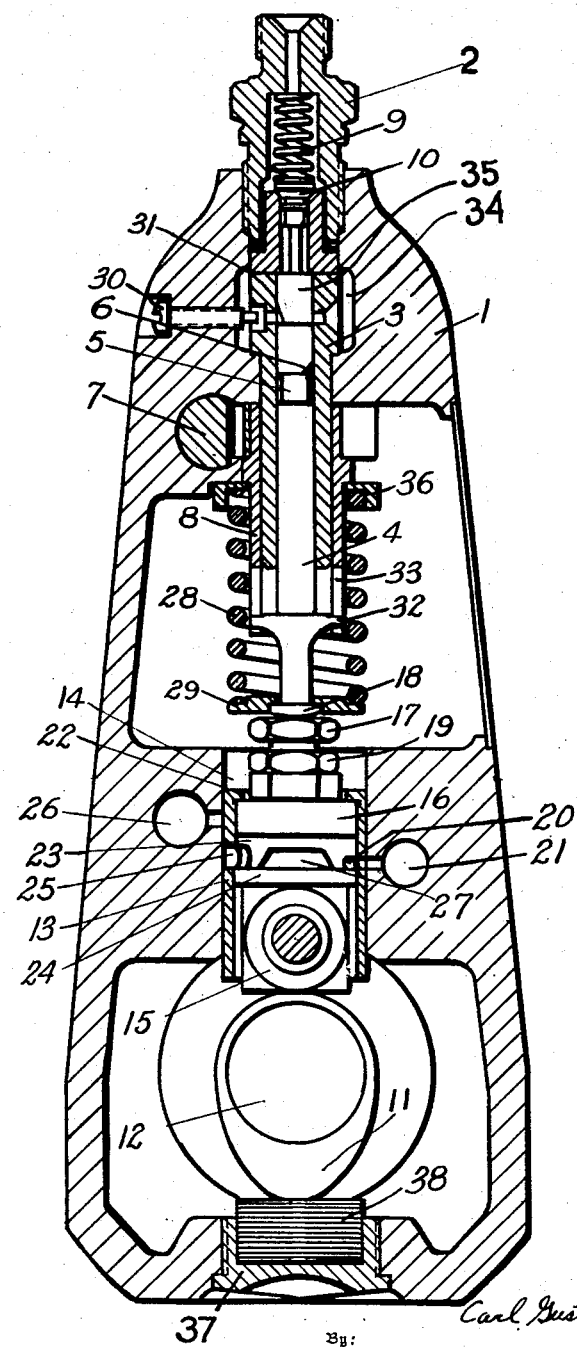

2,670,684

UNITED STATES PATENT OFFICE 2,670,684

FUEL INJECTION DEVICE FOR INTERNAL-COMBUSTION ENGINES

Carl Gustaf Fagerholt, Goteborg, Sweden, assignor to Aktiebolaget Volvo, Goteborg, Sweden, a corporation of Sweden Application January 18, 1951, Serial No. 206,704

Claims priority, application Sweden January 21, 1950

2 Claims. (Cl. 103—41)

The invention relates to fuel injection devices for internal combustion engines and has for its object to provide in such devices for interrupted injection.

One embodiment will be described in the following with reference to the accompanying drawing which shows a section through a fuel injection pump according to the invention.

In the drawing 1 denotes the housing of the pump and 2 a coupling piece for connecting a feed line to the motor cylinder into which the fuel is to be injected. In the housing is inserted a cylinder liner 3 for a fuel piston 4. The liner 3 is held in place by a stop screw 30. The piston 4 has a plane outer end 31 and at some distance from that end has a circumferential groove 5 formed with a bevelled helical face 6, the object of which is to control the amount of fuel injected by rotating the piston 4. The rotation of the piston 4 is effected by movement of a toothed rack member 7 cooperating with a toothed segment on a sleeve 8 surrounding the cylinder liner 3. The piston 4 nearer the inner end thereof has projecting portions 32 slidable in slots 33 in the sleeve 8, so that rotation of the sleeve 8 by means of the rack member 7 also serves to rotate the piston 4. Fuel is supplied from the circumferential groove 34 in the housing and when the piston 4 is in the position shown in the drawing enters the space 35 above the piston. On the pressure stroke of the piston 4 the fuel from the space 35 passes through a non-return valve 10 actuated by a spring 9. When the face 6 reaches the opening communicating with the groove 34 the fuel under pressure in the space 35 is returned through a passage (not shown in the drawing) in the cylindrical surface of the piston 4 to the groove 6 and from there to the groove 34, and by rotating the piston in the manner described by means of the rack member 7 the amount of fuel thus returned can be controlled and thus also the amount injected.

A spring 28 is compressed between an upper and a lower washer 36 and 29 respectively. The upper washer rests against a seat in the pump housing and the lower washer against a flange 18 on the inner end of the piston 4. The spring 28 serves to return the piston 4 after the pressure stroke thereof.

So far the device described for injecting the fuel and for controlling the amount of fuel injected is known and does not form part of the invention.

The piston 4 is actuated by a cam 11 (actuator) on a cam shaft 12. Between the cam 11 and the piston 4 is provided a piston plunger for actuating the piston in response to the rotation of the cam. The piston plunger comprises two essential parts, a sleeve 13 and a dash piston 16. The sleeve 13 is movable in a bore 14 in the pump housing and is closed by a cross wall 24 fixed therein and carrying on the inside an abutment 27 and on the outside a roller 15 for cooperation with the cam 11. The dash piston 16 with the sleeve 13 and the cross wall 24 forms a closed space 23 and is movable in the sleeve 13 between positions determined in one direction by an inturned flange 22 on the sleeve 13 and in the other direction by the abutment 27 on the cross wall 24. The dash piston 16 engages with the inner end of the fuel piston 4 by means of a tappet screw 17 screwed into the dash piston. The tappet screw is adjustable for length in the known way and is locked in position by means of a lock nut 19. The sleeve has two openings 20 and 25 for cooperation with passages 21 and 26 respectively in the pump housing 1.

37 denotes a plug carrying an oil drenched felt pad 38 for lubricating the cam 11.

In the position shown in the drawing the space 23 is in communication with the passage 21 which contains fluid under pressure, for example oil. The pressure of the fluid is such as to hold the dash piston 16 in the upper position shown in the drawing against the pressure of the spring 28. On rotation of the cam shaft 12 the cam 11 lifts the sleeve 13, the latter in its turn, owing to the presence of the pressure fluid in the space 23 taking with it the dash piston 16. When the opening 25 in the sleeve 13 reaches the opening leading to the exit passage 26 the fluid in the space 23 suddenly escapes and the movement of the dash piston 16 momentarily ceases until, on continued movement of the sleeve 13, the abutment 27 is brought into engagement with the inside of the dash piston and moves the latter to its uppermost position. During the continued movement of the cam 11 from its upper to its lower position in the figure the fuel piston 4 is returned to its inner position by the spring 28. During this movement the fuel piston 4 by engaging with the dash piston 16 which in turn is in engagement with the abutment 27 returns the dash piston 16 and the sleeve 13 to their lower positions. When the opening 20 again registers with the opening leading from the passage 21 fluid under pressure again enters the space 23 and forces the dash piston 16 to its upper position as shown in the figure.

It will thus be seen that the device described

What I claim is:

1. Fuel injection device for internal combustion engines, comprising in combination a housing, a cylinder in the housing, a fuel piston movable in the cylinder, means for supplying fuel to the cylinder to the pressure side of the piston, an actuator for effecting the pressure stroke of the piston, means for returning the piston after the pressure stroke, a piston plunger acting between the fuel piston and the actuator and comprising a sleeve having a cross wall and a dash piston movable in the sleeve and forming with the sleeve and the cross wall thereof a confined space, means for supplying fluid under pressure to the confined space at the end of the return stroke of the fuel piston, and means for permitting escape of the fluid from the confined space during the pressure stroke of the fuel piston, thereby to cause a sudden reduction in length of the piston plunger.

2. Fuel injection device for internal combustion engines, comprising in combination a housing, a cylinder in the housing, a fuel piston movable in the cylinder, means for supplying fuel to the cylinder to the pressure side of the fuel piston, an actuator for effecting the pressure stroke of the fuel piston, means for returning the fuel piston after the pressure stroke, a second cylinder in the housing between the fuel piston and the actuator and coaxial with the fuel piston cylinder, a sleeve movable in the second cylinder, adapted to cooperate with the actuator and closed by a cross wall, a dash piston movable in the sleeve adapted to cooperate with the fuel piston and forming with the sleeve and the cross wall thereof a confined space, openings in the wall of the sleeve leading to the confined space, a passage in the housing for delivering fluid under pressure communicating with one of the openings in the wall of the sleeve at the end of the return stroke of the fuel piston so as to admit pressure fluid to the confined space and thereby hold the dash piston at a distance from the cross wall, and a passage in the housing for receiving fluid communicating with the other opening in the sleeve when the latter is actuated by the actuator during the pressure stroke of the fuel piston for escape of fluid from the confined space for suddenly reducing the distance between the dash piston and the cross wall and thereby cause interruption of the injection of the fuel.

CARL GUSTAF FAGERHOLT.

References Cited in the file of this patent

UNITED STATES PATENTS

| Number | Name | Date |
|---|---|---|
| 2,033,579 | Koster et al. | Mar. 10, 1936 |
| 2,041,468 | Grubbs | May 19, 1936 |
| 2,046,491 | Scott | July 7, 1936 |